Oct. 29, 1963  R. P. HUGHES  3,108,817
PISTON RING ASSEMBLY
Filed July 20, 1961

INVENTOR
Ritchmond P. Hughes

BY Cecil L. Wood
ATTORNEY

United States Patent Office 3,108,817
Patented Oct. 29, 1963

3,108,817
PISTON RING ASSEMBLY
Ritchmond P. Hughes, 1907 E. Maddox, Fort Worth, Tex.
Filed July 20, 1961, Ser. No. 125,438
3 Claims. (Cl. 277—136)

This invention relates to a piston ring assembly, and it concerns more particularly the combination of an annular insert receivable on a piston having a peripheral groove therefor, the insert having an annular groove in its outer periphery, and a piston ring received in the last mentioned groove.

An object of the invention is to provide a simple, efficient piston ring assembly as described in which both the annular insert and the piston ring are expandable, while at the same time protecting the piston, and the wall of the cylinder in which it is operable, against wear.

The invention contemplates, in combination with a piston having one or more peripheral grooves therein, a circumferentially split annular insert received in each of the grooves, the annular inserts each having an annular groove in its outer periphery, spring means engageable with opposite end portions of the respective annular inserts biasing said end portions together whereby the annular inserts are firmly seated in the grooves therefor, and a circumferentially split piston ring received in each of the last mentioned grooves, the piston rings being biased outwardly, for engagement with a cylinder in which the piston is operable, by their inherent spring tension.

The invention will be readily understood by referring to the following description and the accompanying drawing, in which.

Figure 1:
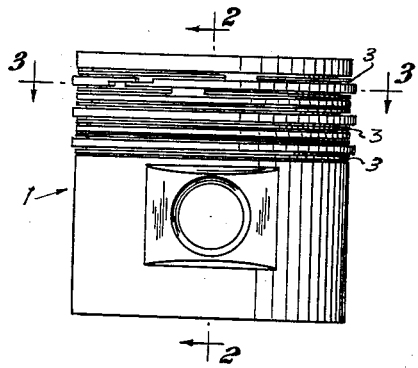
FIGURE 1 is a side view of a piston having a plurality of piston ring assemblies embodying the invention applied thereto.
Figure 3:
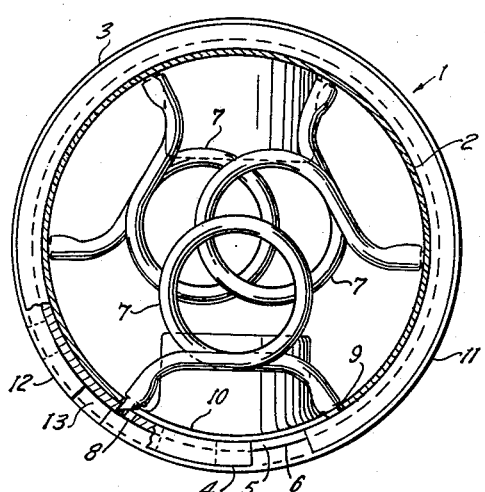
FIGURE 3 is a transverse sectional view taken on the line 3—3 of FIGURE 1.
Figure 2:
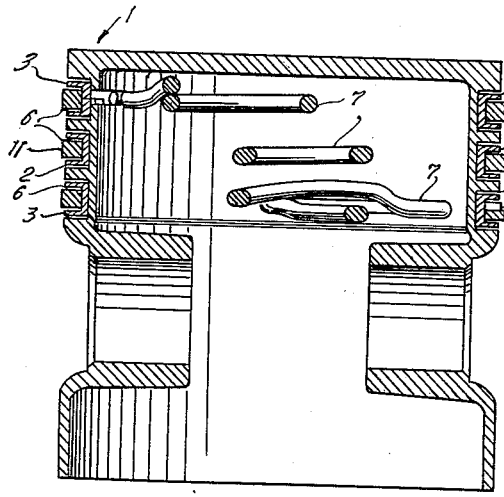
FIGURE 2 is a longitudinal sectional view, on an enlarged scale, taken on the line 2—2 of FIGURE 1.
Figure 4:
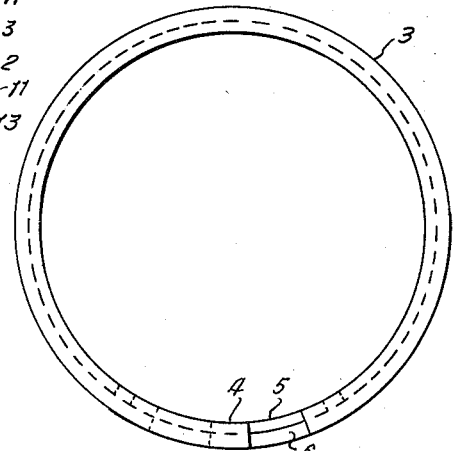
FIGURE 4 is an end view of one of the annular inserts.
Figure 5:
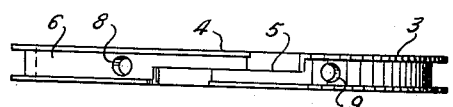
FIGURE 5 is a side view thereof.
Figure 6:
FIGURE 6 is a fragmentary plan view of one of the piston rings.
Figure 7:
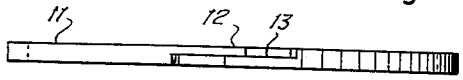
FIGURE 7 is a side view thereof showing the lapping.

Referring to the drawing, the numeral 1 designates generally a piston, such as a piston of an internal combustion engine. The piston 1 has a plurality of longitudinally spaced peripheral grooves 2 therein. The two opposite sides of the respective, grooves 2 are planar, and are arranged parallel to each other, perpendicular to the bottom thereof.

An annular insert 3, which advantageously may be formed of malleable iron or aluminum, for example, is received in each of the grooves 2. The annular inserts 3 are split circumferentially, and the opposite ends thereof, which are of reduced width, mutually overlap, as at 4, 5.

The annular inserts 3 each have an annular groove 6 in its outer periphery. The two opposite sides of the respective grooves 6 are planar, and are arranged parallel to each other, perpendicular to the bottom thereof.

A plurality of springs 7, each of which consists of a single coil of wire having its ends crossed and extending substantially in opposite directions, are engageable with opposite end portions of the respective annular inserts 3. The springs 7 bias said end portions together whereby the annular inserts 3 are firmly seated in the corresponding grooves 2.

A pair of holes 8, 9 are formed in opposite end portions of each of the annular inserts 3, adjacent the overlapping ends 4, 5 thereof. The ends of the springs 7, which are of reduced diameter, are passed through the holes 8, 9 of the respective annular inserts 3, and have shoulders thereon for abutment against the material of the annular inserts 3 surrounding the holes 8, 9, whereby opposite end portions of the annular inserts 3 are biased together.

The springs 7 are placed in their operative positions relative to the corresponding annular inserts 3 after the inserts 3 are in place in the respective grooves 2. The springs 7 are relatively stiff, and are not readily adapted to be expanded manually, as in securing them to opposite end portions of the annular inserts 3. A suitable tool is required for that purpose.

The springs 7 are arranged interiorly of the piston 1, which is hollow, transversely thereof, substantially in alignment with the corresponding annular inserts 3. A plurality of arcuate slots 10, which are formed in the inner wall of the piston 1, communicate with the respective grooves 2 thereof. The ends of the respective springs 7 are passed through the corresponding slots 10.

A piston ring 11, which advantageously may be formed of relatively soft metal, such as bronze, whereby it is incapable of scoring the wall of a cylinder in which the piston 1 is operable, is received in the groove 6 of each of the annular inserts 3.

The piston rings 11 are split circumferentially, and the opposite ends thereof, which are of reduced width, mutually overlap, as at 12, 13. The piston rings 11 are biased outwardly, for engagement with a cylinder in which the piston 1 is operable, by their inherent spring tension.

The invention may be modified in various ways without departing from the spirit and scope thereof.

What is claimed is:

1. In combination with a piston having one or more peripheral grooves therein, a circumferentially split annular insert received in each of the grooves, the annular inserts each having an annular groove in its outer periphery, spring means engageable with opposite end portions of the respective annular inserts biasing said end portions together whereby the annular inserts are firmly seated in the grooves therefor, and a circumferentially split piston ring received in each of the last mentioned grooves, the piston rings being biased outwardly, for engagement with a cylinder in which the piston is operable, by their inherent spring tension.

2. In a piston ring assembly for internal combustion engines, in combination with a piston having a plurality of circumferential grooves therein, an expandable insert ring fitted in each of said grooves, each having an external circumferential groove, an expandable sealing ring in each of the external grooves of said insert rings, and yieldable means internally of said piston and extending through the wall thereof into each of said grooves securing each of said insert rings in their respective grooves.

3. In a piston for internal combustion engines having a plurality of circumferential grooves therein, a circular expansible insert ring fitted in each of said grooves, the said insert ring being formed of a malleable material, yieldable means internally of said piston and extending into the grooves therein for securing said insert rings against expansion and rotation of said grooves, a groove formed circumferentially of each of said insert rings, and an expandable sealing ring in each of the grooved insert rings.

References Cited in the file of this patent

UNITED STATES PATENTS

| | | |
|---|---|---|
| 2,212,042 | Phillips et al. | Aug. 20, 1940 |
| 2,550,879 | Stevens | May 1, 1951 |
| 2,583,957 | Marvin | Jan. 29, 1952 |
| 2,716,581 | Townhill | Aug. 30, 1955 |

FOREIGN PATENTS

| | | |
|---|---|---|
| 425,683 | Great Britain | Mar. 18, 1935 |